(12) United States Patent
Vlad et al.

(10) Patent No.: US 8,649,915 B2
(45) Date of Patent: Feb. 11, 2014

(54) METHOD AND APPARATUS TO FACILITATE PROVIDING A SYNTHETIC VIEW OF TERRAIN FOR USE IN A MOVING VEHICLE

(75) Inventors: Ovidiu Gabriel Vlad, Naperville, IL (US); Lawrence Carl Spaete, Jr., Naperville, IL (US)

(73) Assignee: The Clear View Group LLC, Lovettsville, VA (US)

( * ) Notice: Subject to any disclaimer, the term of this patent is extended or adjusted under 35 U.S.C. 154(b) by 429 days.

(21) Appl. No.: 12/789,907

(22) Filed: May 28, 2010

(65) Prior Publication Data
US 2011/0295445 A1  Dec. 1, 2011

(51) Int. Cl.
*G06F 7/00* (2006.01)

(52) U.S. Cl.
CPC ........................................ *G06F 7/00* (2013.01)
USPC ........ 701/1; 701/3; 701/301; 342/44; 342/46; 342/182

(58) Field of Classification Search
USPC ........ 701/1, 36, 300–302; 382/103, 181, 264; 340/945–996; 342/175–205
See application file for complete search history.

(56) References Cited

U.S. PATENT DOCUMENTS

| | | | |
|---|---|---|---|
| 5,909,512 A * | 6/1999 | Ohshima et al. | 382/251 |
| 6,496,760 B1 | 12/2002 | Michaelson et al. | |
| 6,756,887 B2 * | 6/2004 | Evans | 340/436 |
| 7,352,292 B2 * | 4/2008 | Alter et al. | 340/945 |
| 8,175,761 B2 * | 5/2012 | Nichols et al. | 701/14 |
| 8,264,379 B2 * | 9/2012 | Whitlow et al. | 340/980 |
| 8,350,753 B2 * | 1/2013 | Pal et al. | 342/182 |
| 2002/0069019 A1 * | 6/2002 | Lin | 701/301 |
| 2003/0193411 A1 | 10/2003 | Price | |

FOREIGN PATENT DOCUMENTS

EP    1 462 767 A1    9/2004

OTHER PUBLICATIONS

International Search Report Dated Apr. 18, 2008 from PCT Application No. PCT/US2007/088148.
Jahnavi Chakrabarty et al.; "Multi-View Synthetic Vision Display System for General Aviation" Mar. 6, 2004, Aerospace Conference, 2004, Proceedings. 2004 IEEE Big Sky, MT USA Mar. 6-13, 2004, Piscataway, NJ, USA, IEEE, US, pp. 1618-1627.

\* cited by examiner

*Primary Examiner* — Thomas Tarcza
*Assistant Examiner* — Tyler J Lee
(74) *Attorney, Agent, or Firm* — Fitch, Even, Tabin & Flannery LLP

(57) ABSTRACT

Specific determinations are made in a moving vehicle (901) and with respect to a person in the vehicle who has an ordinary expected gaze directionality while in the moving vehicle. These determinations can comprise automatically determining a position (101) of the moving vehicle with respect to terrain past which the moving vehicle is traveling, and automatically determining an orientation attitude (102) of the moving vehicle with respect to the terrain, and then automatically using (103) this position and orientation attitude to determine (in the absence of executable program instructions) a synthetic view to provide to the person in the vehicle. By one approach this synthetic view comprises a view of the terrain that comports with the ordinary expected gaze directionality of the person in the vehicle.

20 Claims, 3 Drawing Sheets

METHOD AND APPARATUS TO FACILITATE PROVIDING A SYNTHETIC VIEW OF TERRAIN FOR USE IN A MOVING VEHICLE

TECHNICAL FIELD

This invention relates generally to synthetic vision.

BACKGROUND

Synthetic vision systems of various kinds are known in the art. Synthetic vision typically comprises a set of technologies that provide drivers of vehicles (including but not limited to aircraft) with images that assist the driver with understanding their operating environment. Such systems tend to use information regarding position and location to make selective use of stored information regarding local terrain and obstacles available to the driver via a corresponding graphic display.

Synthetic vision continues to hold great promise while also frequently falling fall short of hoped-for benefits, pricing, usability, and value. Problems range from issues regarding the relative utility of the information provided to annoyance with display flickering due to relatively low refresh rates (which is in turn owing in many cases to compromises made with respect to the computational platform selected to support the synthetic vision processing regarding cost and complexity versus capability and performance).

BRIEF DESCRIPTION OF THE DRAWINGS

The above needs are at least partially met through provision of the method and apparatus to facilitate providing a synthetic view of terrain for use in a moving vehicle described in the following detailed description, particularly when studied in conjunction with the drawings, wherein.

Figure 1:
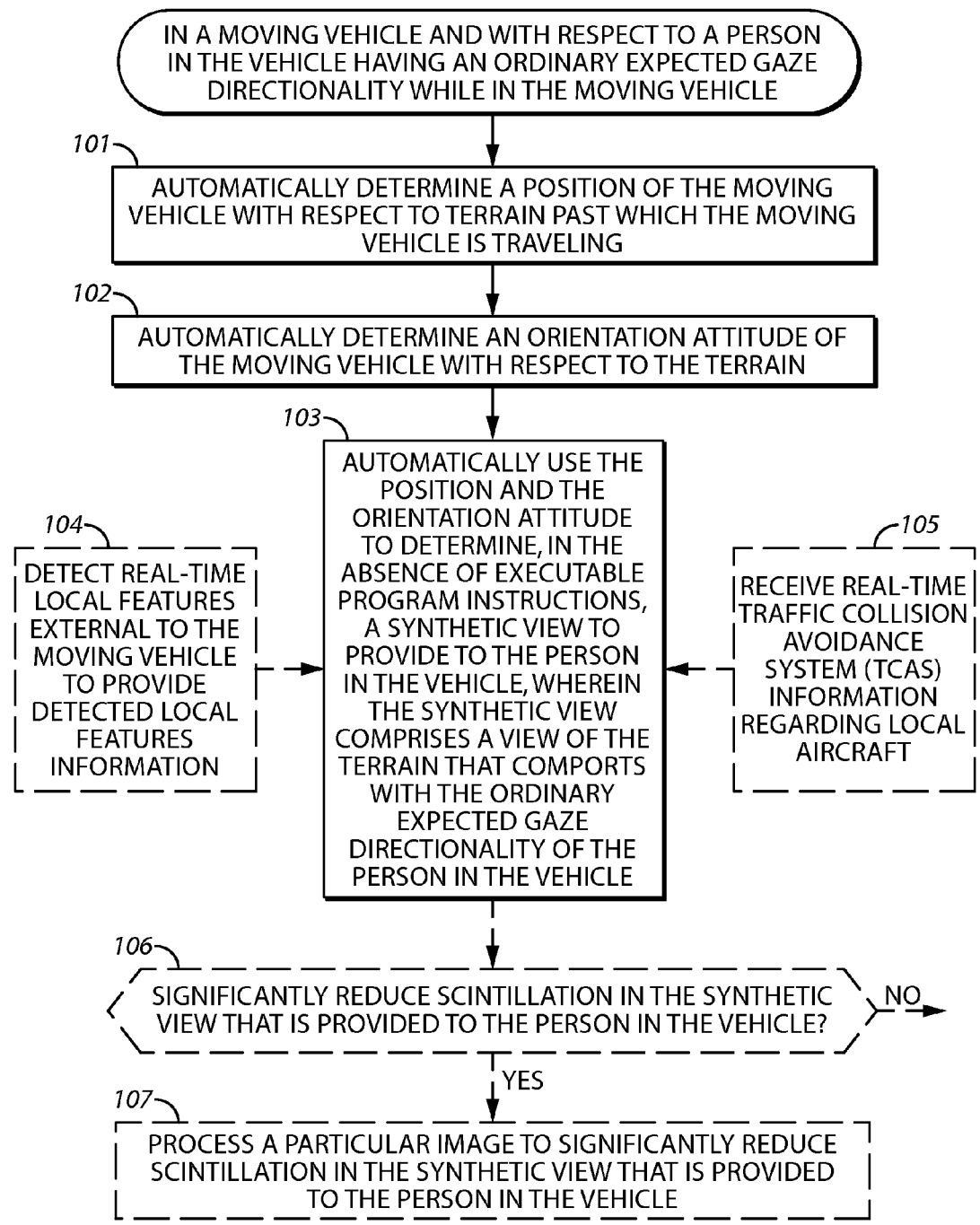
FIG. 1 comprises a flow diagram as configured in accordance with various embodiments of the invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various embodiments, specific determinations are made in a moving vehicle and with respect to a person in the vehicle who has ordinary expected gaze directionality while in the moving vehicle. These determinations can comprise automatically determining a position of the moving vehicle with respect to terrain past which the moving vehicle is traveling and automatically determining an orientation attitude of the moving vehicle with respect to the terrain, and then automatically using this position and orientation attitude to determine (in the absence of executable program instructions) a synthetic view to provide to the person in the vehicle. By one approach this synthetic view comprises a view of the terrain that comports with the ordinary expected gaze directionality of the person in the vehicle. (As used herein, "terrain" can refer to local geography such as roadside points of reference that an automobile may pass, but can also refer to airborne points of reference such as other aircraft that may be in the vicinity of a given aircraft.)

By one approach, determining this synthetic view can comprise identifying a particular image that is stored in a database, wherein the database contains a variety of candidate terrain images. This can further comprise, if desired, using a plurality of databases that each contain candidate terrain images. By one approach, these databases can comprise scaled databases.

When using a stored image in this manner, these teachings will also accommodate processing the selected particular image to thereby significantly reduce scintillation in the synthetic view. Such processing can comprise, for example, low pass filtering the particular image as a function of a ratio of a distance between pixels in an X direction and a distance between pixels in a Y direction. This can also comprise further low pass filtering of the edges of the particular image to thereby reduce informational content at those edges as versus a central portion of the particular image.

These teachings will also accommodate detecting real-time local features external to the moving vehicle and using those detected local features to contribute to the content of the synthetic view. Somewhat similarly, these teachings can also accommodate receiving real-time Traffic Collision Avoidance System (TCAS) information regarding local aircraft and using that information as well to further contribute to the content of the synthetic view.

So configured, a powerful yet economic synthetic vision solution provides vehicle occupants with a clear and intuitive view of terrain features that might otherwise be obscured or unappreciated due to environmental conditions or other reasons. These teachings will support, in a softwareless operating context, a relatively high display refresh rate that avoids prior flickering issues. These teachings will also support the use of extremely high resolution images notwithstanding this high refresh rate, thereby yielding a very clear display capable of usefully providing a large quantity of fine detail of potential use to the vehicle occupants.

These and other benefits may become clearer upon making a thorough review and study of the following detailed description. Referring now to the drawings, and in particular to FIG. 1, an illustrative process that is compatible with many of these teachings will now be presented. The described process 100 can be carried out in a moving vehicle of choice including any of a wide variety of terrestrial vehicles as well as waterborne or airborne vehicles. For the purposes of illustration and with no intention of suggesting limitations in this regard, the examples provided herein will presume the vehicle to comprise an aircraft.

It will also be understood that the described process 100 can be carried out with respect to a person in the vehicle (such as a pilot, co-pilot, navigator, passenger, or the like) who has an ordinary expected gaze directionality while in the moving vehicle. In many cases this expected gaze directionality comprises a function, at least in substantial part, of the person's role while the vehicle moves. When the person comprises a pilot, for example, their expected gaze directionality will ordinarily comprise a forward-looking view out through a windshield. As used herein, this reference to an ordinary expected gaze directionality does not require that the actual person always gaze only in this particular direction, nor even that a given person will ever gaze in this particular direction; rather, this reference to an ordinary expected gaze directionality specifies an anticipated direction of view as would accord with an ordinary and typical person's likely role during movement of the vehicle.

These teachings will also accommodate, if desired, an automatic or selective gaze directionality that, though "expected" under some set of circumstances, is not necessarily physically possible. As one example in these regards, when a pilot of an airplane receives a radio transmission or other indication of another aircraft approaching him from behind, in a general sense one could expect the pilot to wish to be able to turn around to view that other aircraft (regardless of whether such visual contact could in fact occur given a likely lack of direct viewing opportunities in those regards for many airplanes). In such a case, these teachings could be employed to provide a display comprising a rearward-looking view as such a view could correspond to the pilot's ordinary expected gaze directionality under those circumstances.

This process 100 provides for the automatic determination 101 of a position of the moving vehicle with respect to terrain past which the moving vehicle is traveling. This can comprise, for example, determining longitude, latitude, and altitude information for the vehicle. Other substitutes for these particular metrics exist and can be used instead if desired. There are various ways by which such information can be automatically determined. By one approach, for example, this can comprise the use of a Global Positioning System (GPS) receiver to receive GPS signals to determine all three of these parameters. By another approach, or in combination therewith, this can comprise using dead reckoning techniques as are also known in the art.

This process 100 also provides for automatically determining 102 an orientation attitude of the moving vehicle with respect to the terrain. The particular parameters utilized in this regard can vary to some extent with the application setting. When the vehicle comprises an aircraft, this orientation attitude information can comprise one or more of pitch, roll, and yaw information for the vehicle. These parameters are very well known in the art and require no further explanation here.

This process 100 then provides for automatically using 103 this position and orientation attitude information to determine a synthetic view to provide to the person in the vehicle. By one approach, this step occurs in the absence of executable program instructions. This can be supported, for example, through use of a hardware-configured platform and a stored-image approach that avoids the need to reconstruct, generate, or create the desired synthetic view. Further elaboration on this point will appear below as appropriate.

If desired, this process 100 will further comprise detecting 104 real-time local features that are external to the moving vehicle such that these detected local features can be used to contribute to the content of the synthetic view. These local features can comprise, for example, man-made objects such as buildings, radio transmission towers, and the like as may comprise a part of the terrain past which the vehicle is moving. Local features can also comprise temporary and/or mobile features such as, for example, another aircraft or vehicle on a runway. Detection of such local features can be accomplished using any of a variety of technologies and methodologies. Examples include, but are not limited to, radar, infrared, sonar, and so forth.

Also if desired, this process 100 will also accommodate receiving 105 real-time Traffic Collision Avoidance System (TCAS) information regarding local aircraft such that this TCAS information can also be used to contribute as well to the synthetic view. TCAS receivers are known in the art and comprise a computerized avionics device that monitors the airspace around an aircraft, independent of air traffic control, and warns pilots of the presence of other aircraft that may present a threat of an airborne collision. These devices are required of all aircraft that exceed 5700 kg or that are authorized to carry more than 19 passengers.

By one approach, this synthetic view comprises a view of the terrain that comports with the ordinary expected gaze directionality of the person in the vehicle. By then providing this synthetic view via an appropriately located display, the person will have the benefit of a synthetic view of passing terrain that offers information in a highly intuitive manner as the synthetic view accords with the ordinary view of this person.

There are certain pieces of background information that may be useful to understand before providing further elaboration in this regard. For the sake of example and illustration and not by way of limitation, it will be presumed that the vehicle's display always scans from the top left pixel going across the upper row of pixels and then proceeds with the next row of pixels down and that there is no interlacing used with the display. Additionally, there are 1920 pixels in the X direction and 1200 pixels in the Y direction of the display.

Figure 2:
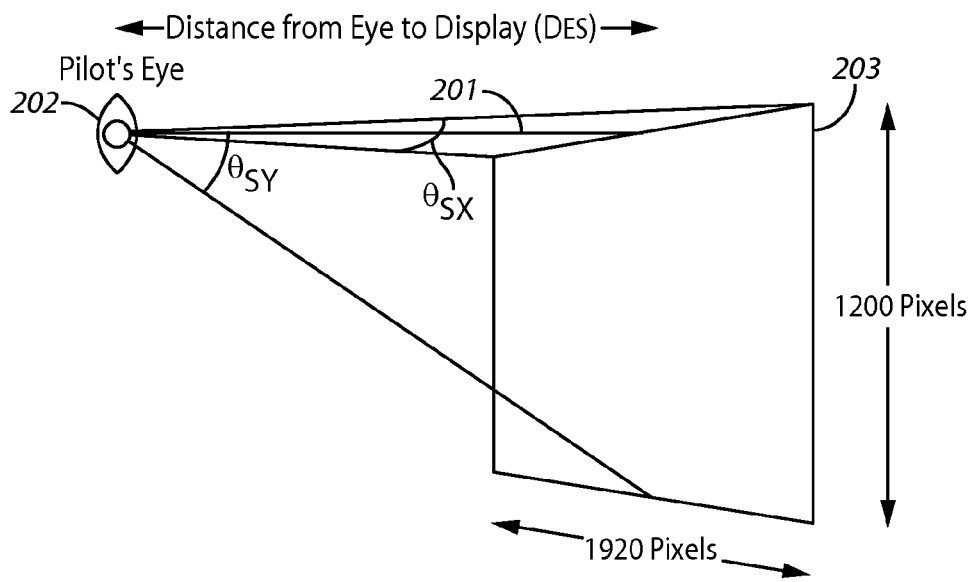
FIG. 2 comprises a schematic diagram as configured in accordance with various embodiments of the invention.

In many application settings it can be assumed that there are several parameters that are constants depending upon the installation of the display in the aircraft. Some of these constants should be the same from one type of aircraft to the next though others may differ. An example of this would be the distance from the pilot's eye to the center of the top-most row of pixels on the screen. Referring now to FIG. 2, it may be assumed for this example that a line 201 from the pilot's eye 202 to the center pixel in the top-most row is perpendicular with the screen 203 in a case where, as shown, the intention is to present the viewer with a view of the outside world (and particularly the ground) as though the display were, in fact, transparent. In this view, $\theta_{SX}$ represents the pilot's viewing angle going across the display 203. Likewise, $\theta_{SY}$ represents the pilot's viewing angle going up and down on the display 203.

Figure 3:
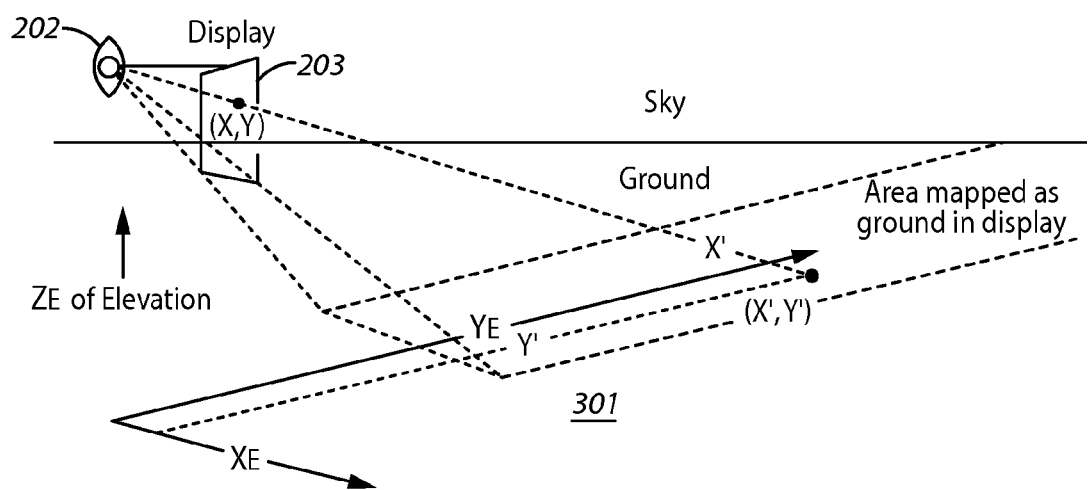
FIG. 3 comprises a schematic diagram as configured in accordance with various embodiments of the invention.

Referring now generally to FIG. 3, calculations can be made to determine, for each pixel on the display 203, a corresponding location on the ground (or in the sky). (In this particular simple illustrative example, the ground is assumed to be flat.) Using the six parameters already noted (latitude, longitude, altitude, pitch, yaw, and roll) and applicable geometry one can readily determine such information as will be well understood by those skilled in the art. By one approach, this can comprise mapping each pixel on the display 203 to a point on the ground (or in the sky) and then finding the appropriate display image for each particular point on the ground.

With this in mind, it may be well noted at this point that the aforementioned step of determining 103 a synthetic view to provide to the person in the vehicle can itself comprise identifying a particular image that is stored in a database. This particular image can comprise, for example, one of many candidate terrain images. By one approach, there can be a plurality of databases available for this purpose, where each of the databases has stored therein a plurality of candidate terrain images.

If desired, these databases can comprise so-called scaled databases. By one approach, this can comprise scaling each database to contain the same essential imagery but with only one half the resolution of a next higher-resolution database. Using this approach, one can provision as many scaled databases as may be usefully required as the storage requirements for all of the databases together will only use 4/3rds the storage space of the highest resolution database being utilized. Using scaled databases provides a number of benefits, amongst them being an ability to provide for perspective of distance in the resultant synthetic view with little or no so-called jagged lines.

Viewed another way, these different databases contain information on how to display the desired terrain view when looking at that location from different distances. In other words, a pixel on the display that is to represent a location in the database that is very close to the current position would represent a very small area of land on the Earth. However, when that same location on the Earth is displayed in a single pixel from a distance that is very far away then this same pixel will represent a much greater area of the planet's surface. Consequently, a different database can be used where the averaging of the different pixels for the desired location has already taken place offline.

Such an approach saves on the number of computations that must take place in real-time.

By one approach, one can determine the distance between adjacent points by averaging with respect to points in a row on the display 203. As generally the aircraft and the ground below will both tend to be level, there will tend to be relatively small change in the differences of these points. It may also be noted that an average based upon using adjacent points in a same row will normally tend to be smaller than an average that is based on points taken from the same column for a given point of interest. As the average distance changes in the row versus the column, this can influence which scaled database to use. It may be noted, however, that using a scaled database with a smaller average distance, while offering greater detail at times, can also yield increased scintillation. The opposite is also often true.

Referring again to FIG. 1, when using images as suggested earlier as are retrieved from one or more databases (and particularly when working with scaled databases), this process 100 can further optionally provide for determining 106 whether to process the retrieved image(s) to significantly reduce scintillation in the synthetic view that might otherwise be provided to the viewer in the vehicle. This determination can be based, for example, upon determining whether there is a large enough difference in the distance between pixels in the X and Y directions of the database content such that a different scaling of the database would be applied. If no difference in database scaling is needed, then this determination step 106 can conclude that such processing is not required and the process 100 can be diverted as appropriate to meet the needs of a given application setting.

When this determination is positive, however, this process 100 can then provide for processing 107 the particular image to significantly reduce scintillation in the synthetic view that is provided to the person in the vehicle. By one approach, this can comprise computing an amount of error in a determination of the distance between pixels in the X direction and the Y direction. In particular, when the viewing angle for a particular pixel is close to zero degrees with respect to the horizon, even small truncation errors in the viewing angle can contribute to significant errors when making a scaling database selection (and that, in turn, can cause scintillation as the scaling selection may be off from one painting of the screen to a next subsequent painting of the screen). By taking this error into account when making a scaling decision such scintillation can be avoided.

As one illustrative example in these regards, and without intending any corresponding limitations, this might comprise using a corresponding pre-calculated table of values that could be stored, for example, in an available memory (such as a read-only memory (ROM). The values themselves can be computed to correspond to a desired amount of resolution (given a particular intended or expected application setting). One could then realize a difference as pertains to the values that both precede and follow a given desired value, where, for example, one-half of these values could serve as an approximation of the amount of error that is associated with the pre-calculated value.

By way of a more specific example, but without intending any limitations by way of these points of specificity, presume that one hundredth of a degree resolution is desired in terms of angular measurements when computing geometric operations such as sine, cosine, or tangent. There could be a large corresponding table for each type of geometric operation. This could include, for example, a row in the table for each angle from 0.00 degrees up to 359.99 degrees (hence, 36,000 values). The cosine for each of these angles could be computed and reside in the table accordingly to the desired resolution:

| | |
|---|---|
| 0.00 | 1.00000000 |
| 0.01 | 0.99999998 |
| 0.02 | 0.99999994 |
| 0.03 | 0.99999986 |
| ... | |
| 359.99 | 0.999999998 |

These teachings will of course accommodate numerous variations in these regards. For example, in view of attendant symmetry one might provide only 18,000 values instead of 36,000 in such a table.

Using such a table, and when determining the cosine of the angle 0.02 degrees, the amount of error associated with this can be approximated by using one-half times the differences of the angles above and below the desired angle (i.e., 0.01 and 0.03 degrees). The difference in this example would be 0.00000012 and the approximated error is half of that or 0.00000006. By carrying the amount of error throughout the calculation(s), one can adjust the X and Y pixel distances to allow for the worst-case error and use an algorithm such as a scaling algorithm to smooth out any errors by allowing for a different scaling of the database to reduce the scintillation.

By another approach, low pass filtering the particular image as a function of a ratio of a distance between pixels in an X direction and a distance between pixels in a Y direction. For example, this can comprise using a weighted average of the average distances associated with both the row and columns for a given point. A ratio reflecting use of 90 percent of the row average and 10 percent of the column average works well in many application settings.

In some application settings (as when an airplane assumes an unusual orientation), however, such an approach can lead to problems that essentially result because the X and Y axes basically switch. Such an occurrence can result in problems when applying what amounts to a fixed ratio in terms of the X and Y pixel distances. If desired, and as another approach in these regards, one can utilize a linear scale between the largest and smallest pixel distances.

To illustrate by way of a non-limiting example, assume that the values between 100 meters and 5000 meters are to be linearly scaled in the context of a vehicle comprising an aircraft. When the total distance from the pilot's point of view is less than 100 meters to a point of interest, then the smaller of the distance between the X and Y pixels could be used. When, however, the total distance from the pilot's point of view is between 100 and 5000 meters to the point of interest, then scaling can be applied using a ratio given by the formula (5000−smaller distance)/5000. The distance represented between points on the display could then be given by the formula:

smaller distance*ratio+larger distance*(1−ratio).

Accordingly, in this example the distance represented between pixels on the display serves to determine the proper scaling of the database to be used.

To continue with this same example, when the total distance from the pilot's point of view is larger than 5000 meters to the point of interest, one could employ the larger of the distance between the X and Y pixels.

Using this approach, smaller distances are used for closer items and a larger distance is used for far-away distances to thereby reduce scintillation. Additionally, using linear scaling for items in between can assist to maintain a perception of linear lines in the final display.

In addition to avoiding the aforementioned concerns, such an approach will also often allow greater resolution for items that are close to the vehicle and a lesser resolution for points that are further away from the vehicle. This reduced resolution, in turn, will typically reduce corresponding scintillation as well. As one example in these regards, one could employ a smaller pixel distance.

Using this approach in conjunction with an aircraft, the range at which things are scaled will generally tend to be a function of the amount of distance that the vehicle is off the ground and also possibly the vehicle rate of movement with respect to the ground. Accordingly when the aircraft is on the ground, the observer is likely mainly concerned about objects that are at most a few 100 meters away. When the aircraft is cruising at, for example, 38,000 feet, however, then everything on the ground is about 10,000 meters away at the closest point. Consequently, in the latter case one could expect the scaling to begin at something like 50000 meters rather than, say, 500 meters. As noted, vehicle speed may also influence such an approach (particularly when the vehicle comprises a land-based vehicle such as an automobile). When stationary, it may be that the relevant observer is most interested in items that are relatively close. As speed increases, however, the distance of interest will also likely increase (to accommodate, for example, the driver's reaction time).

By another approach, applied alone or in conjunction with the foregoing, this processing can also comprise low pass filtering the edges of the particular image to thereby reduce informational content at those edges as versus a central portion of the particular image. This is often acceptable as the main object of interest will often be in the center of the display 203. Reducing the level of detail somewhat at the edges of the display will therefore often not produce noticeable issues with respect to resolution while also serving to reduce the amount of perceived scintillation.

Those skilled in the art will recognize and appreciate that these teachings are highly flexible and readily scaled to accommodate a wealth of informational content. For example, by one approach, the synthetic view can comprise, at least in part, photographic imagery of the terrain (as captured, for example, by satellite and/or other aircraft). Such photographic content can be used alone or in combination with other imagery of choice. As another example in this regard, if desired, the synthetic view can comprise, at least in part, elements of an aviation navigation chart. Examples in this regard might include, but are not limited to, specific roads of navigational interest and value, generally denoted urban areas (using, for example, a color such as yellow), radio frequencies employed by different airports and airstrips for their air-to-ground communications, airport names and spheres of coverage, and so forth. Again, such aviation navigation chart content can be employed alone (thereby making the synthetic view a kind of dynamic moving chart that moves in accordance with the movement of the aircraft such that the presentation of the scale, field of view, and orientation of the chart accords with the pilot's own view of the external terrain through the front windshield) or in combination with other informational content (using, for example, an overlay approach).

Figure 4:
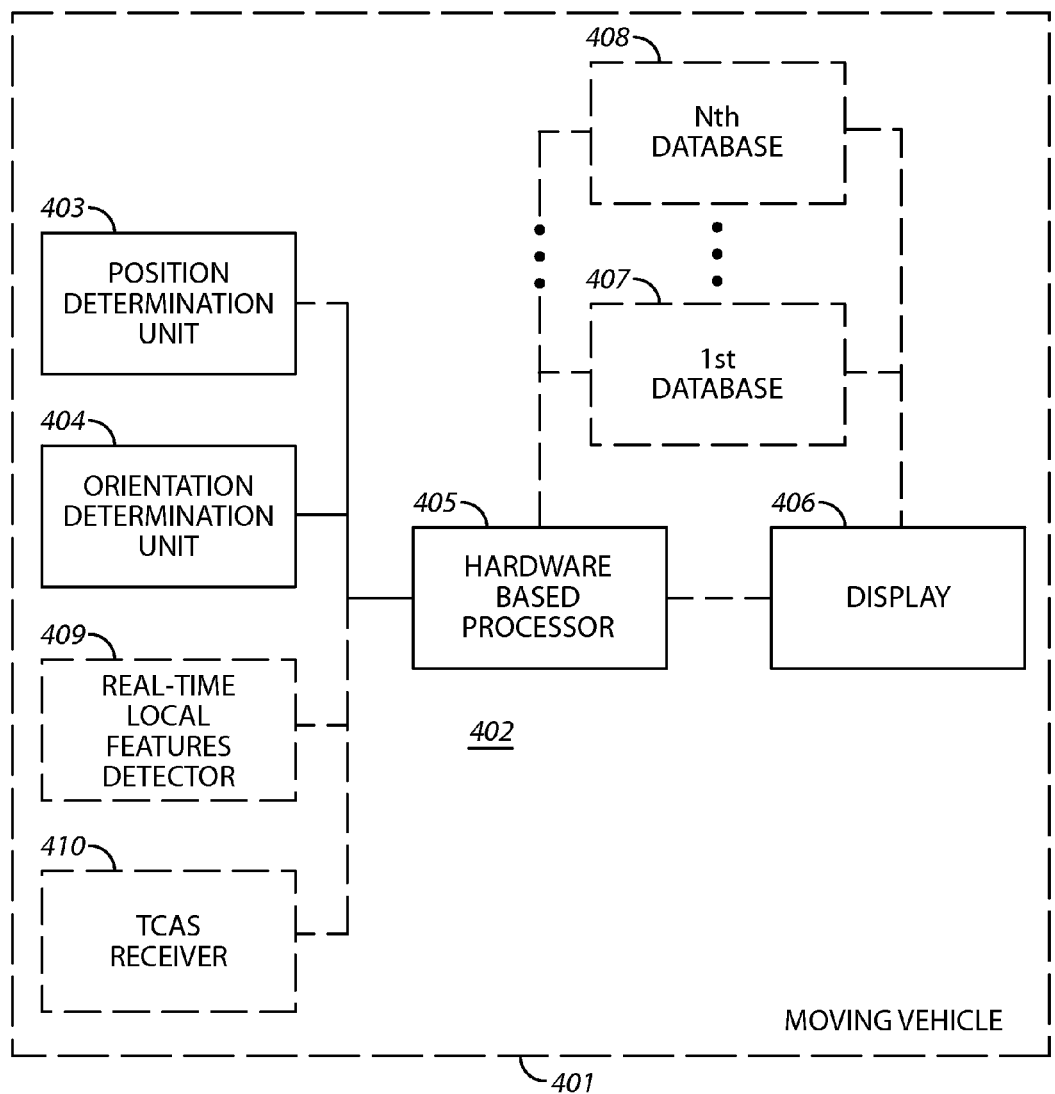
FIG. 4 comprises a block diagram as configured in accordance with various embodiments of the invention.

Those skilled in the art will appreciate that the above-described processes are readily enabled using any of a wide variety of available and/or readily configured platforms, including partially or wholly programmable platforms as are known in the art or dedicated purpose platforms as may be desired for some applications. Referring now to FIG. 4, an illustrative approach to such a platform will now be provided.

As noted earlier, these teachings may be employed in conjunction with a moving vehicle 401 of choice. The enabling apparatus 402 can comprise a position determination unit 403 that is configured and arranged to automatically determine a position of the moving vehicle 401 with respect to terrain past which the moving vehicle 401 is traveling and an orientation determination unit 404 that is configured and arranged to automatically determine an orientation attitude of the moving vehicle 401 with respect to the aforementioned terrain. These two units 403 and 404 operably couple to a hardware-based processor which further operably couples to a display 406 (either directly or via certain databases as described below, depending upon the needs and/or opportunities as tend to characterize a given application setting).

As noted, in this illustrative embodiment the processor comprises a hardware-based processor 405. As used herein, this will be understood to refer to a processing platform having logic elements that are each comprised of dedicated corresponding hardware components. In particular, it will be understood that this reference to a hardware-based processor specifically refers to a processing platform that lacks executable program instructions (where the latter are understood to comprise software-based instructions as versus hard-wired components). This approach, though counterintuitive to many, has been determined by the applicant to provide a number of advantages. These include, but are not necessarily limited to, simplicity and reliability in operation. The challenges of designing such a platform are largely overcome in this particular instance by taking into account and relying upon the various teachings set forth herein, as these teachings greatly simplify the computational requirements of selecting and then employing high quality synthetic view images at a high refresh rate.

As noted earlier, these teachings can employ one or more databases comprising, if desired, scaled databases. Such databases are shown in FIG. 4 as a first database 407 through an Nth database 408 (where "N" will be understood to comprise an integer greater than one) that operably couple to the aforementioned hardware-based processor 405. Also if desired, this apparatus can comprise a real-time local features detector 409 and/or a TCAS receiver 410 as mentioned earlier. Such additional components can also be operably coupled to the hardware-based processor 405 to thereby further inform its functionality.

So configured and arranged, the hardware-based processor 405 can be configured and arranged to carry out one or more of the steps, actions, or functionality as has been set forth herein. This can specifically comprise, for example, using the position and orientation attitude information from the position determination unit 403 and the orientation determination unit 404 to determine a synthetic view (as described above) to provide to a person in the vehicle 401 via the display 406.

Those skilled in the art will recognize and understand that such an apparatus 402 may be comprised of a plurality of physically distinct elements as is suggested by the illustration shown in FIG. 4. It is also possible, however, to view this illustration as comprising a logical view, in which case one or more of these elements can be enabled and realized via a shared platform. It will also be understood that such a shared platform may comprise a wholly or at least partially programmable platform as are known in the art.

So configured and arranged, these teachings permit a very high resolution display of highly relevant external information to be presented via a synthetic display in a manner that renders identification, interpretation, and use of that information in a highly intuitive manner by the viewer. The real-time accord between the presentation of such information, along with the position and orientation-based presentation of this information in a manner that comports with the real world view that the observer otherwise has of the same field of view, for example, contributes significantly in this regard.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method comprising:
   in a moving vehicle and with respect to a person in the vehicle having an ordinary expected gaze directionality while in the moving vehicle, using hardware for:
   automatically determining a position of the moving vehicle with respect to terrain past which the moving vehicle is traveling;
   automatically determining an orientation attitude of the moving vehicle with respect to the terrain;
   automatically using the position and the orientation attitude to determine, in the absence of executable program instructions, a particular image to provide to the person in the vehicle as a synthetic view, wherein the synthetic view comprises a view of the terrain that comports with the ordinary expected gaze directionality of the person in the vehicle;
   processing the particular image to use as the synthetic view to significantly reduce scintillation in the synthetic view that is provided to the person in the vehicle by, at least in part, computing an amount of error in a determination of a distance between pixels in an X direction and a Y direction.

2. The method of claim 1 wherein the position comprises longitude, latitude, and altitude information for the vehicle.

3. The method of claim 1 wherein the orientation attitude comprises pitch, roll, and yaw information for the vehicle.

4. The method of claim 1 wherein determining a synthetic view to provide to the person in the vehicle comprises identifying a particular image that is stored in a database.

5. The method of claim 4 wherein determining a synthetic view to provide to the person in the vehicle comprises identifying a particular image that is stored in a database comprises identifying a particular image as is stored on one of a plurality of databases that each contain candidate terrain images.

6. The method of claim 5 wherein the plurality of databases comprise scaled databases.

7. The method of claim 1 wherein the synthetic view comprises, at least in part, an aviation navigation chart.

8. The method of claim 7 wherein the synthetic view further comprises, at least in part, photographic imagery of the terrain.

9. The method of claim 1 further comprising:
   detecting real-time local features external to the moving vehicle to provide detected local features information;
   using the detected local features to contribute to content of the synthetic view.

10. The method of claim 1 further comprising:
    receiving real-time Traffic Collision Avoidance System (TCAS) information regarding local aircraft;
    using the Traffic Collision Avoidance System (TCAS) information to contribute to content of the synthetic view.

11. A method comprising:
    in a moving vehicle and with respect to a person in the vehicle having an ordinary expected gaze directionality while in the moving vehicle, using hardware for:
    automatically determining a position of the moving vehicle with respect to terrain past which the moving vehicle is traveling;
    automatically determining an orientation attitude of the moving vehicle with respect to the terrain;
    automatically using the position and the orientation attitude to determine, in the absence of executable program instructions, a particular image to provide to the person in the vehicle as a synthetic view, wherein the synthetic view comprises a view of the terrain that comports with the ordinary expected gaze directionality of the person in the vehicle;
    processing the particular image to use as the synthetic view to significantly reduce scintillation in the synthetic view that is provided to the person in the vehicle by, at least in part, utilizing a linear scale between largest and smallest pixel distances as correspond to the synthetic image.

12. The method of claim 11 wherein the position comprises longitude, latitude, and altitude information for the vehicle.

13. The method of claim 11 wherein the orientation attitude comprises pitch, roll, and yaw information for the vehicle.

14. The method of claim 13 wherein determining a synthetic view to provide to the person in the vehicle comprises identifying a particular image that is stored in a database.

15. The method of claim 14 wherein determining a synthetic view to provide to the person in the vehicle comprises identifying a particular image that is stored in a database comprises identifying a particular image as is stored on one of a plurality of databases that each contain candidate terrain images.

16. The method of claim 15 wherein the plurality of databases comprise scaled databases.

17. The method of claim 11 wherein the synthetic view comprises, at least in part, an aviation navigation chart.

18. The method of claim 17 wherein the synthetic view further comprises, at least in part, photographic imagery of the terrain.

19. The method of claim 11 further comprising:
   detecting real-time local features external to the moving vehicle to provide detected local features information;
   using the detected local features to contribute to content of the synthetic view.

20. The method of claim 11 further comprising:
   receiving real-time Traffic Collision Avoidance System (TCAS) information regarding local aircraft;
   using the Traffic Collision Avoidance System (TCAS) information to contribute to content of the synthetic view.

* * * * *